US008654217B2

(12) United States Patent
Farid

(10) Patent No.: US 8,654,217 B2
(45) Date of Patent: Feb. 18, 2014

(54) DEVICE AND METHOD FOR DETECTING DUST ON AN IMAGE SENSOR

(75) Inventor: Hany Farid, White River Junction, VT (US)

(73) Assignee: Nikon Corporation, Tokyo (JP)

(*) Notice: Subject to any disclaimer, the term of this patent is extended or adjusted under 35 U.S.C. 154(b) by 139 days.

(21) Appl. No.: 12/864,743

(22) PCT Filed: Oct. 29, 2008

(86) PCT No.: PCT/US2008/081566
§ 371 (c)(1),
(2), (4) Date: Jul. 27, 2010

(87) PCT Pub. No.: WO2009/139790
PCT Pub. Date: Nov. 19, 2009

(65) Prior Publication Data
US 2010/0309343 A1    Dec. 9, 2010

Related U.S. Application Data

(60) Provisional application No. 61/053,131, filed on May 14, 2008, provisional application No. 61/099,068, filed on Sep. 22, 2008.

(51) Int. Cl.
*H04N 5/217*    (2011.01)
(52) U.S. Cl.
USPC .......................................... 348/241; 348/275
(58) Field of Classification Search
USPC .......................................... 348/241; 382/275
See application file for complete search history.

(56) References Cited

U.S. PATENT DOCUMENTS

| 6,233,364 | B1 | 5/2001 | Krainiouk et al. |
| 2005/0129276 | A1 | 6/2005 | Haynes et al. |
| 2007/0122053 | A1 | 5/2007 | Kim et al. |
| 2007/0122056 | A1 | 5/2007 | Steinberg et al. |

FOREIGN PATENT DOCUMENTS

| JP | 2000-137804 | 5/2000 |
| JP | 2004-220553 | 8/2004 |
| JP | 2005-079856 | 3/2005 |

OTHER PUBLICATIONS

International Preliminary Report on Patentability for PCT/US2008/081566 (related to the present application), publication date Nov. 25, 2010, Nikon Corporation.
International Search Report and Written Opinion for PCT/US08/81566 (related to the present application), publication date Dec. 23, 2008, Nikon Corporation.
Japanese Patent Office, Office Action for Japanese Patent Application No. 2011-509461 dated Feb. 26, 2013, Japan (English Translation).

*Primary Examiner* — Roberto Velez
*Assistant Examiner* — Yih-Sien Kao
(74) *Attorney, Agent, or Firm* — Roeder & Broder LLP

(57) ABSTRACT

A system and method for detecting dust (18) on an image sensor (20) from a single captured image (14) of an actual scene (12) includes a control system (22) that evaluates at least one of a hue channel (466), a value channel (470), and a saturation channel (468) of the captured image (14) to determine if there is dust (18) on the image sensor (20). For example, the control system (22) can evaluate the hue channel (466) and the value channel (470) of the captured image (14) to determine if there is dust (18) on the image sensor (20). With information from the hue channel (466) and the value channel (470), the control system (22) can compute a computed probability (572) of dust (18) for a plurality of pixels (362) of the captured image (14).

25 Claims, 7 Drawing Sheets

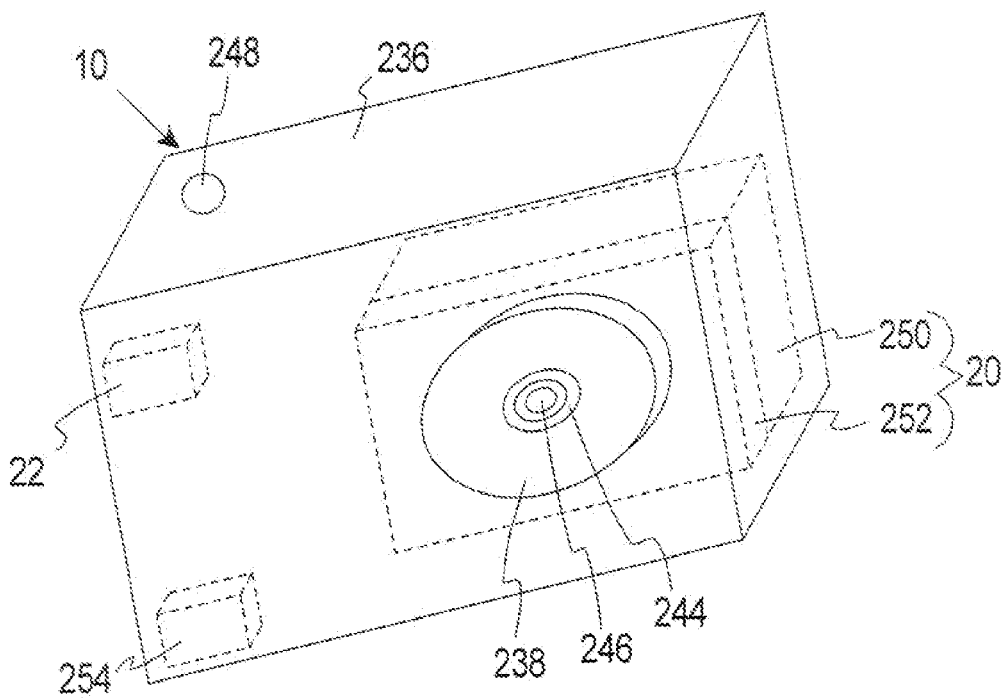

DEVICE AND METHOD FOR DETECTING DUST ON AN IMAGE SENSOR

BACKGROUND

Cameras are commonly used to capture an image of a scene that includes one or more objects. Many cameras include a camera body and a removable lens that can be replaced with a different lens to adjust the optical qualities of the camera. Unfortunately, dust can accumulate on an image sensor of the camera when the lens is removed from the camera body.

Further, the dust on the image sensor can cause the resulting captured image to include one or more image aberrations that degrades the quality of the image captured with the camera.

SUMMARY

The present invention is directed to a control system for detecting dust on an image sensor from a single captured image of an actual scene. In one embodiment, the control system evaluates at least one of a hue channel, a value channel, and saturation channel of the captured image to determine if there is dust on the image sensor. For example, the control system can evaluate the hue channel and the value channel of the captured image to determine if there is dust on the image sensor. In one embodiment, the control system computes a probability of dust for a plurality of pixels of the captured image based on the hue channel and the value channel.

With this design, the control system can evaluate a single image and notify the user that the image sensor needs to be cleaned.

Additionally, the control system can subtract the computed probability from one for each pixel to calculate an inverted probability for each pixel. Moreover, the control system can apply a filter to either the computed probability or the inverted probability of each pixel to calculate a filtered probability. Subsequently, the control system can create a binary image by setting all filtered probabilities having a value lower than a predetermined probability threshold to have a binary probability of zero, and setting all filtered probabilities having a value higher than the predetermined probability threshold and having a probability equal to a test probability value to have the binary probability of one.

Moreover, as discussed in more detail below, to reduce the number of incorrect indications of dust, the control system can group any adjacent pixels having a binary probability of one into one or more pixel groups. Subsequently, the control system can determine a connected pixel size for each pixel group. Finally, the control system can identify as dust any pixel group having a connected pixel size that is (i) greater than a predetermined low pixel number, and (ii) less than a predetermined high pixel number.

The present invention is also directed to a camera that detects dust on an image sensor, and a method for detecting dust on an image sensor utilizing a single captured image from an actual scene.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is a simplified front perspective view of the image apparatus of FIG. 1;

FIG. 3 is a simplified pixel representation of a captured image;

FIG. 4C is a simplified pixel representation of a value channel of the captured image of FIG. 3;

FIG. 5 is a simplified pixel representation of the computed probabilities for the pixels of the captured image of FIG. 3;

FIG. 6 is a simplified pixel representation of the inverted probabilities for the pixels of the captured image of FIG. 3;

FIG. 7 is a simplified pixel representation of the median probabilities for the pixels of the captured image of FIG. 3;

FIG. 8 is a simplified pixel representation of the binary probabilities for the pixels of the captured image of FIG. 3;

DESCRIPTION

Figure 1:
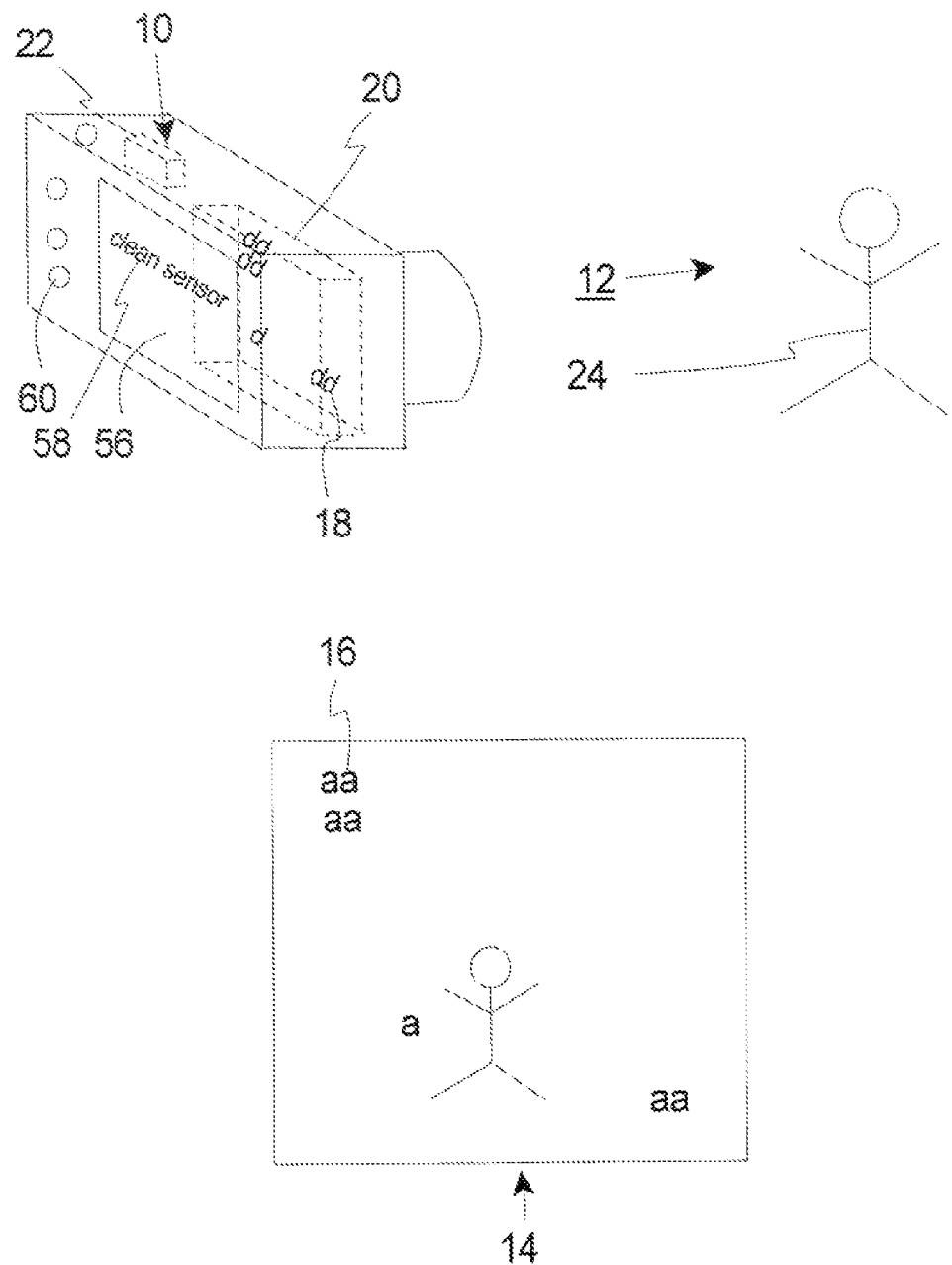
FIG. 1 is a simplified view of a scene, an image apparatus having features of the present invention, and a captured image.

FIG. 1 is a simplified perspective illustration of an image apparatus 10 (e.g. a camera) having features of the present invention, and an actual scene 12. The image apparatus 10 records a captured image 14 (illustrated away from the image apparatus 10) that includes one or more image aberrations 16 (illustrated with a's) caused by dust 18 (illustrated as d's) on an image sensor 20 (illustrated in phantom) of the image apparatus 10. In one embodiment, the image apparatus 10 includes a control system 22 (illustrated in phantom) that uses a unique method for analyzing the single digital image 14 of an actual scene 12 to estimate if there is dust 18 on the image sensor 20.

As an overview, in certain embodiments, the present method uses hue channel information and value channel information from the single captured image 14 to estimate if there is dust on the image sensor 20. Subsequently, the control system 22 can notify the user of the image apparatus 10 that the image sensor 20 needs to be cleaned.

The type of scene 12 captured by the image apparatus 10 can vary. For example, the scene 12 can include one or more objects 24, e.g. animals, plants, mammals, the sky, and/or environments. For simplicity, in FIG. 1, the scene 12 is illustrated as including one object 24. Alternatively, the scene 12 can include more than one object 24. In FIG. 1, the object 24 is a simplified stick figure of a person.

It should be noted that the location of the dust 18 on the image sensor 20 is random, and that the control system 22 can locate the dust on any region of the image sensor 20. It should also be noted that the captured image 14 is from an actual scene 12 that includes one or more objects, and not a captured image 14 with a lens cap (not shown) positioned on an optical assembly of the image apparatus 10.

It should be noted that the present methods disclosed herein can be used on a high resolution captured image 14 that is stored, or a lower resolution captured image such as a thru-image.

FIG. 2 illustrates a simplified, front perspective view of one, non-exclusive embodiment of the image apparatus 10. In this embodiment, the image apparatus 10 is a digital camera, and includes an apparatus frame 236, an optical assembly 238, and the image sensor 20 (illustrated as a box in phantom), in addition to the control system 22 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 236 can be rigid and support at least some of the other components of the image apparatus 10. In one embodiment, the apparatus frame 236 includes a generally rectangular shaped hollow body that forms a cavity that receives and retains at least some of the other components of the camera.

The apparatus frame 236 can include an aperture 244 and a shutter mechanism 246 that work together to control the amount of light that reaches the image sensor 20. The shutter mechanism 246 can be activated by a shutter button 248. The shutter mechanism 246 can include a pair of blinds (sometimes referred to as "blades") that work in conjunction with each other to allow the light to be focused on the image sensor 20 for a certain amount of time. Alternatively, for example, the shutter mechanism 246 can be all electronic and contain no moving parts. For example, an electronic image sensor 20 can have a capture time controlled electronically to emulate the functionality of the blinds.

The optical assembly 238 can include a single lens or a combination of lenses that work in conjunction with each other to focus light onto the image sensor 20. In one embodiment, the optical assembly 238 is removable from the apparatus frame 236. With this design, different optical assemblies 238 can be selectively attached to the apparatus frame 236 to change the optical qualities of the image apparatus 10.

The image sensor 20 captures information for the captured image 14 (illustrated in FIG. 1). The design of the image sensor 20 can vary according to the type of image apparatus 10. For a digital type camera, the image sensor 20 includes a sensor assembly 250 (illustrated in phantom), a filter assembly 252 (illustrated in phantom), and a storage system 254 (illustrated in phantom).

The sensor assembly 250 receives the information (e.g. light) that passes through the aperture 244 and converts the light into electricity. One non-exclusive example of a sensor assembly 250 for digital cameras is known as a charge coupled device ("CCD"). An alternative sensor assembly 250 that may be employed in digital cameras uses complementary metal oxide semiconductor ("CMOS") technology.

The sensor assembly 250, by itself, produces a grayscale image as it only keeps track of the total quantity of the light that strikes the surface of the sensor assembly 250. Accordingly, in order to produce a full color image, the filter assembly 252 is generally used to capture the colors of the image.

The storage system 254 stores the various captured images 14 (illustrated in FIG. 1) before these images are ultimately printed out, deleted, transferred or downloaded to an auxiliary storage system or a printer. The storage system 254 can be fixedly or removably coupled to the apparatus frame 236. Non-exclusive examples of suitable storage systems 254 include flash memory, a floppy disk, a hard disk, or a writeable CD or DVD.

The control system 22 is electrically connected to and controls the operation of the electrical components of the image apparatus 10. The control system 22 can include one or more processors and circuits, and the control system 22 can be programmed to perform one or more of the functions described herein. In FIG. 2, the control system 22 is secured to the apparatus frame 236 and the rest of the components of the image apparatus 10. Further, the control system 22 is positioned within the apparatus frame 236.

In certain embodiments, the control system 22 includes software that estimates if there is dust on the image sensor 20 and subsequently notifies the user if dust is detected.

Referring back to FIG. 1, the image apparatus 10 includes an image display 56 that displays the captured image 14. With this design, the user can decide which images 14 should be stored and which images 14 should be deleted. In FIG. 1, the image display 56 is fixedly mounted to the rest of the image apparatus 10. Alternatively, the image display 56 can be secured with a hinge mounting system (not shown) that enables the display 56 to be pivoted. One non-exclusive example of an image display 56 includes an LCD screen.

Further, the image display 56 can display other information that can be used to control the functions of the image apparatus 10. For example, the image display 56 can include a notification 58 to the user that the image sensor 20 needs to be cleaned. For example, the notification 58 can be in words or an error message. Additionally or alternatively, the image display 56 can display the approximate location of the dust on the image sensor 20. Alternatively, the image apparatus 10 can include one or more indicator lights that are illuminated when the image sensor 20 needs cleaning.

Moreover, the image apparatus 10 can include one or more control switches 60 electrically connected to the control system 22 that allows the user to control the functions of the image apparatus 10. For example, one or more of the control switches 60 can be used to selectively switch the image apparatus 10 to the dust estimation processes disclosed herein.

FIG. 3 is a simplified sixteen by sixteen pixel 362 representation of a captured image 314. For simplicity, in this example, the captured image 314 has captured a scene (not shown in FIG. 3) that is very constant in color. For example, the scene can be of a constant color sky or a constant color wall with no variation in color. Alternatively, for example, the present method can be used to detect dust on the image sensor with a captured image of a scene that is not constant in color.

It should be noted that FIGS. 3-8 each include a two-dimensional orientation system that illustrates an X axis, and a Y axis. In this example, each of the pixels 362 can be labeled relative to this coordinate system. For example, the bottom left corner pixel 362 can be identified as pixel (X1, Y1), while the top right corner pixel 362 can be identified as pixel (X16, Y16). Alternatively, the pixels 362 can be identified in another fashion.

In FIG. 3, most of the pixels 362 have the same Red-Blue-Green ("RGB") color score, namely C1. However, a few of the pixels 362 have a RGB color score of C2 which is different that C1. This is because dust on the image sensor (not shown in FIG. 3) has caused these RGB scores to be slightly different for these pixels.

It should be noted that designations of C1 and C2 have been chosen merely for convenience of representation in FIG. 3. Typically, for the RGB color space, each pixel will have a red score, a blue score, and a green score. In this example, (i) each pixel labeled C1 has the exact same red score, the exact same blue score, and the exact same green score (e.g. red=120, green=25, blue=132); (ii) each pixel labeled C2 has the exact same red score, the exact same blue score, and the exact same green score (e.g. red=118, green=29, blue=131); and (iii) the red, blue, and/or green scores for the pixels labeled C1 are different from the red, blue, and/or green scores for the pixels labeled C2.

In FIG. 3, pixels (X3, Y12), (X3, Y13), (X3, Y14), (X3, Y15), (X4, Y12), (X4, Y13), (X4, Y14), (X4, Y15), (X5, Y13), (X5, Y14), (X5, Y15), (X6, Y7), (X7, Y7), (X14, Y2), (X15, Y2), (X14, Y3), (X15, Y3), (X13, Y4), (X14, Y4), and (X15, Y4) are labeled C2 and are different in color from the other pixels because of dust on the image sensor. In this simplified example, the variations in color of the pixels are not caused by variations in the scene because this captured scene in this example is constant in color.

The present invention provides a unique way to estimate if the variation in color in the single captured image is caused by dust on the image sensor. In one embodiment, the control system 22 (illustrated in FIG. 1) analyzes the captured image 314 to compute a probability of dust at each pixel. For example, the control system 22 can convert the captured image 314 from the RGB color space to a hue, saturation, value ("HSV") color space. This can be done with a simple transformation from the RGB color space to the HSV color space. Subsequently, the control system 22 analyzes information from one or more of the HSV channels (e.g. (i) the hue channel and the value channel, (ii) the saturation channel and the value channel, or (iii) the hue channel, the saturation channel, and the value channel) to compute the probability of dust on the image sensor.

Figure 4A:
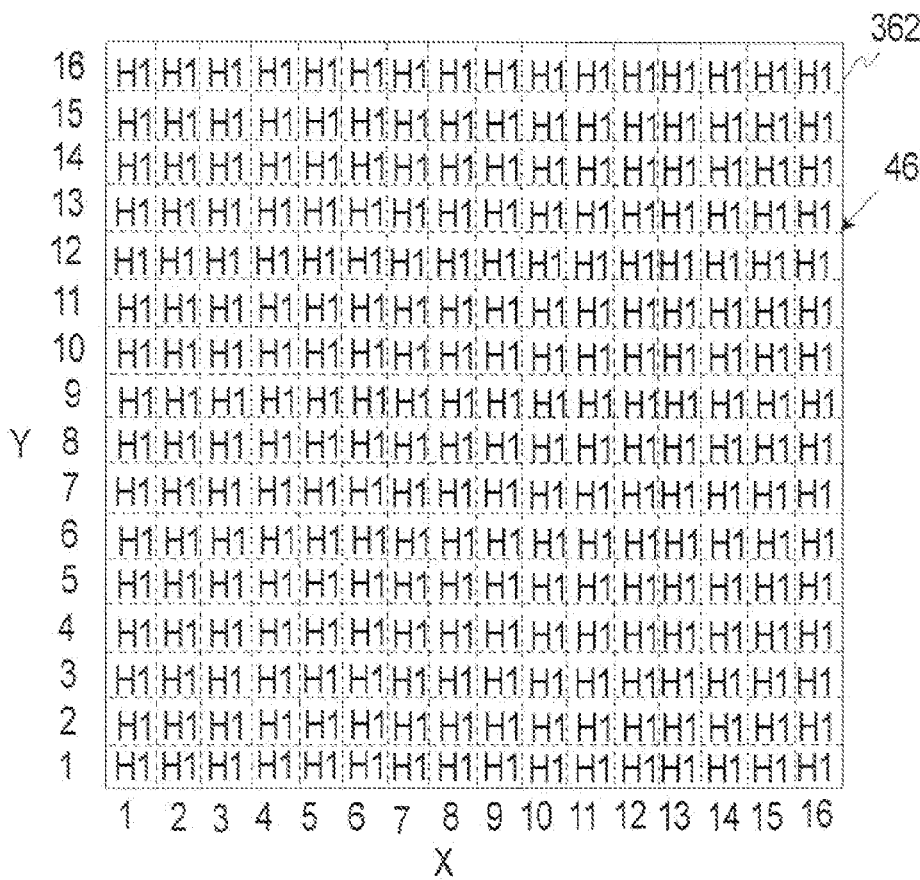
FIG. 4A is a simplified pixel representation of a hue channel of the captured image of FIG. 3.
Figure 4B:
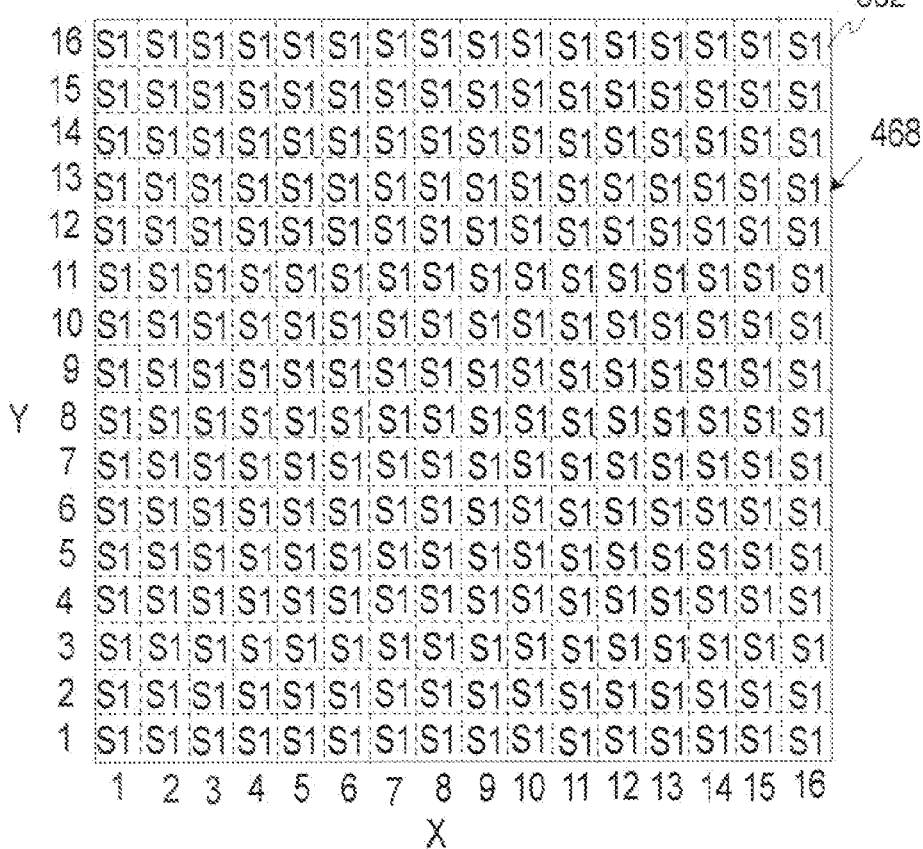
FIG. 4B is a simplified pixel representation of a saturation channel of the captured image of FIG. 3.

FIG. 4A is a simplified sixteen by sixteen pixel representation of a resulting hue channel 466 of the captured image 314 of FIG. 3; FIG. 4B is a simplified sixteen by sixteen pixel representation of a resulting saturation channel 468 of the captured image 314 of FIG. 3; and FIG. 4C is a simplified sixteen by sixteen pixel representation of a resulting value channel 470 of the captured image 314 of FIG. 3.

In FIG. 4A, each of the pixels 362 have the same hue score, namely H1. This is because, as provided herein, dust on the image sensor typically does not influence the hue score. Stated in another fashion, because in this example, the scene is constant in color, the hue channel will have the same score at each pixel even if that pixel is covered with dust. It should be noted that designation H1 has been chosen merely for convenience of representation in FIG. 4A.

Somewhat similarly, in FIG. 4B, each of the pixels 362 have the same saturation score, namely S1. This is because dust on the image sensor typically does not influence the saturation score. It should be noted that designation S1 has been chosen merely for convenience of representation in FIG. 4B.

Figures 4C, 5:
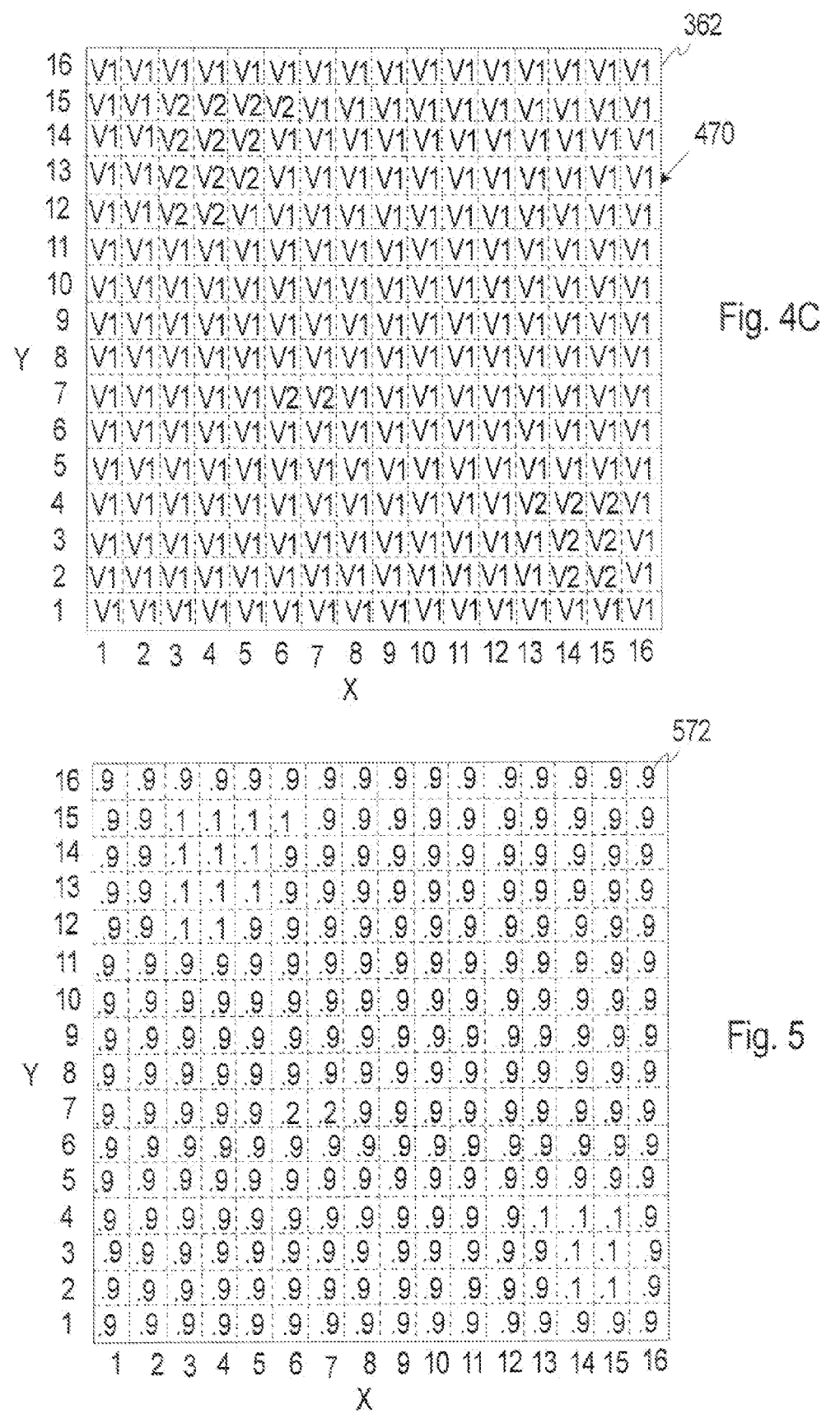

Further, in FIG. 4C, most of the pixels 362 have the same value score, namely V1. However, a few of the pixels 362 have a value score of V2 which is different that V1. This is because dust on the image sensor has caused these value scores to be different. It should be noted that designations of V1 and V2 have been chosen merely for convenience of representation in FIG. 4C.

It should be noted that dust on the image sensor causes the value score to be darker. Thus, in this example, the value V2 is less than the value V1 (i.e., darker).

In FIG. 4C, pixels (X3, Y12), (X3, Y13), (X3, Y14), (X3, Y15), (X4, Y12), (X4, Y13), (X4, Y14), (X4, Y15), (X5, Y13), (X5, Y14), (X5, Y15), (X6, Y7), (X7, Y7), (X14, Y2), (X15, Y2), (X14, Y3), (X15, Y3), (X13, Y4), (X14, Y4), and (X15, Y4) are labeled V2 and have a different value score from the other pixels because of dust on the image sensor.

As provided herein, in one embodiment, the control system 22 (illustrated in FIG. 1) uses an algorithm for detecting sensor dust from a single digital image 314. In one embodiment, the sensor dust is assumed to multiplicatively attenuate a small localized region in the image of unknown position and shape. The present invention teaches a method to detect this region or regions.

More specifically, as provided herein, the control system 22 can compute the probability of dust at each pixel or group of pixels based on information from one or more of the HSV channels. Basically, as provided above, dust at a pixel or a group of pixels influences the value channel score without influencing the hue channel score. In one embodiment, the problem of detecting dust is framed in a probabilistic framework. Specifically, for each pixel (or pixel region), the control system 22 determines the probability of seeing a specified value (v) score given a hue (h) score. This can be formalized as follows:

$$P(V=v|H=h).\qquad\text{Equation 1}$$

Where P is the probability, and V and H are random variables embodying the image value and hue. Using Bayes' law, this probability can be expanded as follows:

$$P(V=v|H=h)=P(H=h|V=v)P(V=v)/P(H=h).\qquad\text{Equation 2}$$

Equation 2 can rewritten for notational simplicity as:

$$P(V|H)=P(H|V)P(V)/P(H).\qquad\text{Equation 3}$$

The conditional $P(H|V)$ and marginal $P(V)$ probabilities can each be estimated from a single image using simple histograming. In one embodiment, these probabilities are computed at every pixel in the image. Alternatively, these probabilities can be computed for groups of pixels (image segments).

Based on this model, a region of dust will have a small estimated probability $P(V|H)$.

In one embodiment, the pixels are grouped according to their respective hue score. For example, the pixels having a hue score of H1 are grouped together, and the pixels having a hue score of H2 are grouped together. Subsequently, the distribution of the value scores for each hue score group is determined. A possible region of dust is one that has a value score that is statistically unlikely (i.e., $P(V|H)$ is close to zero). Stated in another fashion, the value score for each of the pixels with a consistent hue score are evaluated. With this, a probability distribution can be built. Subsequently, any pixels outside the expected probability distribution can be initially classified as possible dust.

The probability is computed directly using Equation 3. Specifically, the probabilities $P(H|V)$, $P(V)$, and $P(H)$ give the underlying probabilities for any given values of H and V. So for any given pixel, the image is converted from the RGB color space to the HSV color space. Next, the H and V values for every pixel are plugged into these computed probabilities to yield a final probability for each pixel.

As a simplified example, an image is captured that has only two unique scores for H (0,1) and two unique scores for V (0,1). Further, in this example:
P(H=0)=0.5, P(H=1)=0.5, and
P(V=0)=0.75, P(V=1)=0.25, and
P(H=0|V=0)=0.9, P(H=1|V=0)=0.1, P(H=0|V=1)=0.7, P(H=1|V=1)=0.3.

In this example, the probability of a pixel having, for example V=0 and H=1 is:

$$P(V=0|H=1)=P(H=1|V=0)P(V=0)/P(H=1)$$
$$=0.1*0.75/0.5=0.15.$$

With this design, a computed probability of dust at each pixel can be calculated.

FIG. 5 is a simplified sixteen by sixteen pixel representation of the computed probabilities 574 for the pixels 362 of the captured image 314 of FIG. 3. More specifically, the control system 22 has computed the probability of dust at each pixel 362 of the captured image 314 and FIG. 5 illustrates the resulting computed probabilities 574.

As provided herein, each of the pixels 362 will have a computed probability 574 that is a number between zero and one. For simplicity, most of the pixels have the same probability score, namely 0.9. However, a few of the pixels 362 have a computed probability score of 0.1, and a few of the pixels 362 have a computed probability score of 0.2. This is because dust on the image sensor (not shown in FIG. 3) has caused these value scores at these pixels to be different and darker than expected for the hue scores at these pixels. It should be noted that computed probabilities of 0.1, 0.2 and 0.9 have been chosen merely for convenience of reference and are not actual probabilities of any image.

In FIG. 5, (i) pixels (X3, Y12), (X3, Y13), (X3, Y14), (X3, Y15), (X4, Y12), (X4, Y13), (X4, Y14), (X4, Y15), (X5, Y13), (X5, Y14), (X5, Y15), (X14, Y2), (X15, Y2), (X14, Y3), (X15, Y3), (X13, Y4), (X14, Y4), and (X15, Y4) have a probability score of 0.1; pixels (X6, Y7) and (X7, Y7) have a probability score of 0.2; and the remaining pixels have a probability score of 0.9.

In this example, pixels with a lower computed probability score (e.g. 0.1 or 0.2) are candidates for having dust, while pixels with a higher computed probability score (e.g. 0.9) are not candidates for having dust. This is somewhat counterintuitive. Thus, the computed probabilities 572 can be inverted by the control system 22.

Figures 6, 7:
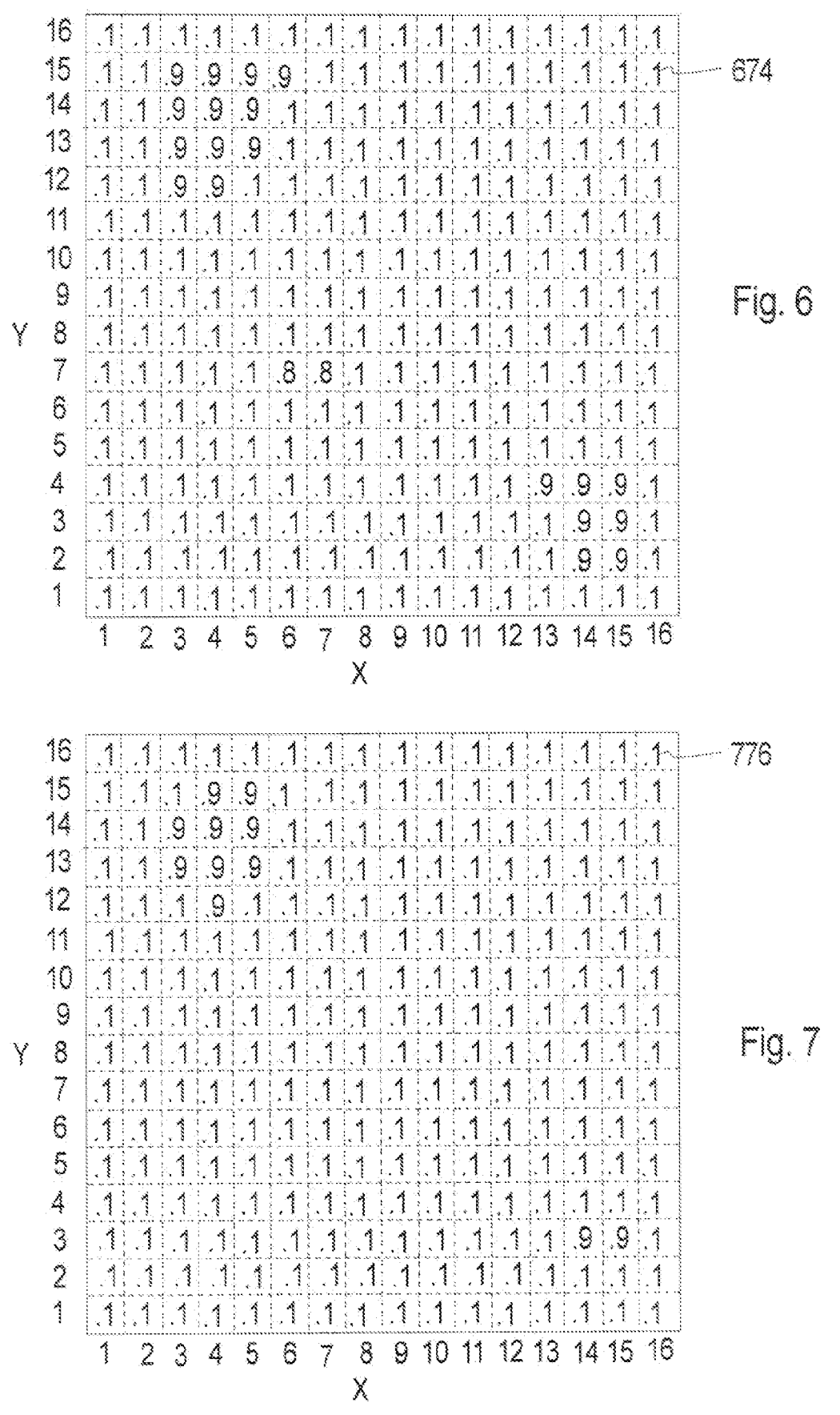

FIG. 6 is a simplified sixteen by sixteen pixel representation of the inverted probabilities 674 for the pixels 362 of the captured image 314 of FIG. 3. More specifically, the control system 22 subtracts the computed probability from one. As a result thereof, pixels with a lower inverted probability score (e.g. 0.1 or 0.2) are not candidates for having dust, while the pixels with higher inverted computed probability scores (e.g. 0.9) are now candidates for having dust. This can be expressed as follows:

$$IP = 1 - P \qquad \text{Equation 4}$$

Where IP is the inverted probability, and P is the computed probability.

In FIG. 6, (i) pixels (X3, Y12), (X3, Y13), (X3, Y14), (X3, Y15), (X4, Y12), (X4, Y13), (X4, Y14), (X4, Y15), (X5, Y13), (X5, Y14), (X5, Y15), (X14, Y2), (X15, Y2), (X14, Y3), (X15, Y3), (X13, Y4), (X14, Y4), and (X15, Y4) have a inverted probability score of 0.9; pixels (X6, Y7) and (X7, Y7) have an inverted probability score of 0.8; and the remaining pixels have an inverted probability score of 0.1.

Once the computed probability 572 or the inverted probability 674 is computed, post-processing filtering is performed in order to reduce false positives (non-dust regions classified as dust). For example, the computed probability 572 or the inverted probability 674 can be subjected to the filtering steps described below to remove spurious and isolated pixels.

FIG. 7 is a simplified sixteen by sixteen pixel representation of the filtered probabilities 776. More specifically, FIG. 7 illustrates the filtered probabilities 776 after each of the inverted probabilities 674 have been subjected to a three pixel by three pixel median filter by the control system 22. With a three pixel by three pixel median filter, each pixel is compared to its neighboring eight pixels that surround that particular pixel, and the median value is selected as the filtered probability 776 for that particular pixel.

For example, referring back to FIG. 6, when filtering pixel (X4, Y12) having an inverted probability of 0.9, (i) the inverted probability of 0.9 for pixel (X4, Y13); (ii) the inverted probability of 0.9 for pixel (X5, Y13); (iii) the inverted probability of 0.1 for pixel (X5, Y12); (iv) the inverted probability of 0.1 for pixel (X5, Y11); (v) the inverted probability of 0.1 for pixel (X4, Y11); (vi) the inverted probability of 0.1 for pixel (X3, Y11); (vii) the inverted probability of 0.9 for pixel (X3, Y12); and (viii) the inverted probability of 0.9 for pixel (X3, Y13) are considered. In this example, five of the pixels (including the center pixel (X4, Y12)) have a value of 0.9, and four of the pixels have a value of 0.1. Accordingly, the filtered probability 776 for pixel (X4, Y12) is 0.9. This procedure is repeated for each of the pixels to generate the filtered probabilities 776.

Alternatively, the filter can be another type of filter, e.g. (i) a four by four median filter, (ii) a five by five median filter, (iii) a nine by nine median filter, or (iv) an averaging filter that averages the values of the neighboring pixels to get the filtered probability 776. Still alternatively, the filter can be used instead on the computed probabilities 572 from FIG. 5 to obtain the filtered probabilities 776.

Subsequently, in certain embodiments, the filtered probabilities 776 can be further processed by converting the filtered probabilities 776 into binary probabilities 878. In one embodiment, the control system 22 creates a binary image 880 by setting all filtered probabilities 776 having a value lower than a predetermined probability threshold to have a binary probability 878 of zero, and setting all filtered probabilities having (i) a score that is equal to a predetermined test probability value and (ii) having a score equal to or greater than the predetermined probability threshold to have the binary probability 878 of one.

Figure 8:
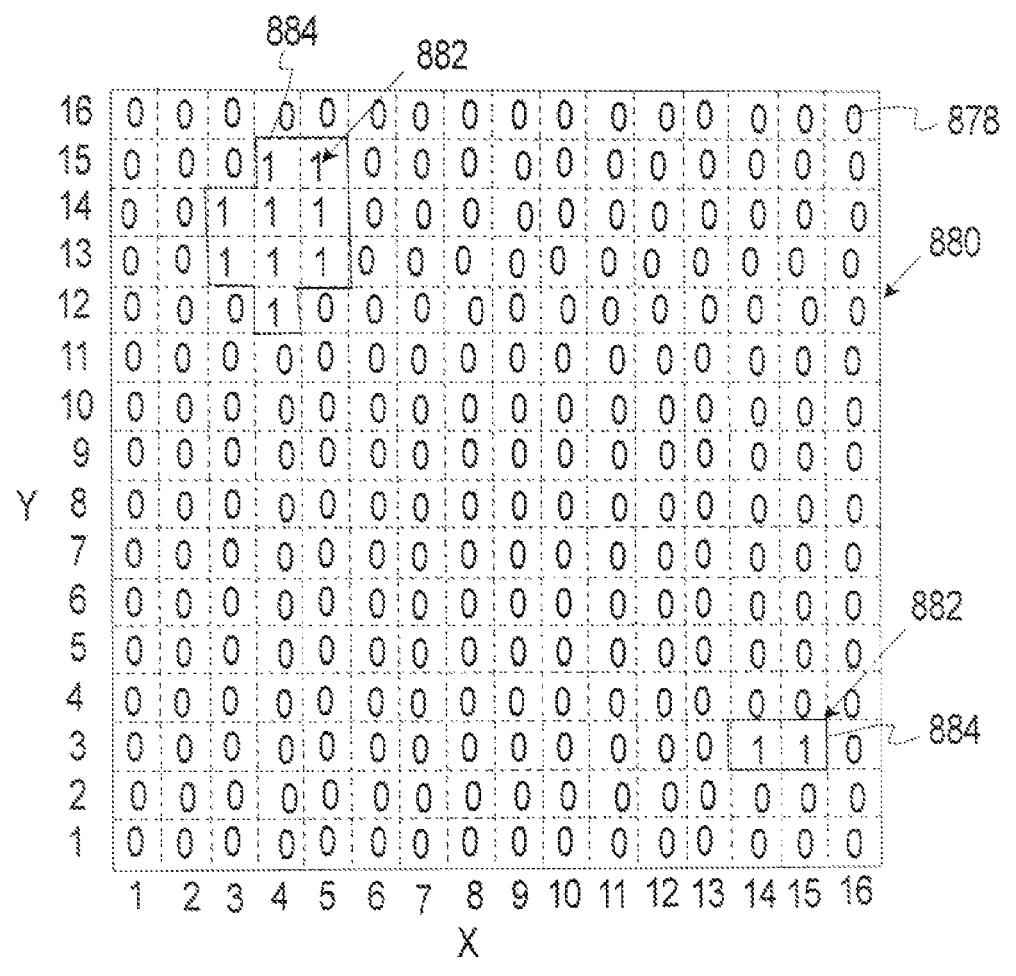

FIG. 8 is a simplified sixteen by sixteen pixel representation of the binary probabilities 878. In this example, the predetermined probability threshold for example can be 0.85 and the predetermined test probability value is 0.9. With this example, (i) all of the filtered probabilities 776 that have a score that is less than 0.85 are converted to zeros, (ii) all filtered probabilities 776 having score that is equal to the predetermined test probability value (e.g. 0.9 in this example) are converted to ones, and (iii) all filtered probabilities 776 having a score that is equal to or greater than 0.85, but are not equal to the present predetermined test probability value (e.g. 0.9 in this example) are converted to zeros.

It should be noted that this process is repeated for each score that is above the predetermined probability threshold. For example, if some of the filtered probabilities have a score of 0.93, the binary probabilities 878 can be generated by converting (i) all of the filtered probabilities 776 that have a score that is less than 0.85 to zeros, (ii) all filtered probabilities 776 having score that is equal to the predetermined test probability value (e.g. 0.93 in this example) ones, and (iii) all filtered probabilities 776 having a score that is equal to or greater than 0.85, but are not equal to the present predetermined test probability value (e.g. 0.93 in this example) to zeros. As yet another example, if some of the filtered probabilities have a score of 0.97, the binary probabilities 878 can be generated by converting (i) all of the filtered probabilities 776 that have a score that is less than 0.85 to zeros, (ii) all filtered probabilities 776 having score that is equal the predetermined test probability value (e.g. 0.97 in this example) to ones, and (iii) all filtered probabilities 776 having a score that is equal to or greater than 0.85, but are not equal to the present predetermined test probability value (e.g. 0.97 in this example) to zeros.

Alternatively, is should be noted that the binary notation could be switched, e.g. setting all filtered probabilities 776 having a value lower than a predetermined probability threshold to have a binary probability 878 of one, and setting all filtered probabilities 776 having a score that is equal to the predetermined test probability value to have the binary probability 878 of zero. Still alternatively, other predetermined probability thresholds can be utilized. In non-exclusive alternative examples, the predetermined probability threshold could be 0.88, 0.90, 0.92, 0.94, or 0.96.

Next, the control system 22 groups pixels that are adjacent (and connected) and that have a binary probability of one into one or more pixel groups 882. In the example of the binary image 880 illustrated in FIG. 8, there are two pixel groups 882 of adjacent pixels that have the binary probability of one. Alternatively, the binary image 880 could include less than two or more than two spaced apart pixel groups.

Next, the control system 22 determines a connected pixel size 884 (represented with dark lines) for each pixel group 882. In the example, illustrated in FIG. 8, one of the pixel groups 882 has a connected pixel size 884 of nine pixels, while the other pixel group has a connected pixel size 884 of two. In this example, there are nine pixels in one pixel group 882, and two pixels in the other pixel group 882. Thus, the size of the connected pixel size 884 will depend upon the number of connected pixels in each pixel group 882.

As provided herein, dust typically occupies between approximately 9 adjacent pixels and two hundred and twenty-five pixels. Thus, to reduce the number of false positive, in certain embodiments, the control system 22 can identify as dust any pixel group 882 having a connected pixel size 884 that is greater than or equal to a predetermined low pixel number and/or less than or equal to a predetermined high pixel number. For example, the predetermined low pixel number can be nine pixels, while the predetermined high pixel number can be two hundred and twenty-five pixels. In this example, the control system 22 would identify the nine pixel group 882 from FIG. 8 as possible dust, while the two pixel group 882 would be too small.

Thus, the control system 22 eliminates small pixel groups 882 (because these are too small to be significant dust), and large pixel groups 882 (because these are too large to be dust and these are likely features in the scene).

It should be noted that other predetermined low pixel numbers and/or other predetermined high pixel numbers can be utilized. Alternative, non-exclusive examples of predetermined low pixel numbers can be 7, 8, 10, 12, or 15 pixels, and alternative, non-exclusive examples of predetermined high pixel numbers can be 200, 250, 300 pixels.

Additionally, after the step of filtering the pixel groups 882 to determine if the pixel groups 882 are too small or too large to be likely dust regions, the control system 22 can perform another test to confirm that the scores are influenced by dust. For example, the control system 22 can check to see if the average value score in the possible dust region is less than the average value score in the immediate border region around the dust. This is because a true dust region should have value scores that are less (darker) than the value scores of the pixels adjacent to the possible dust region.

Referring back to FIG. 4C, the average value score of the pixels in the nine pixel group 882 is V2 while the average score of the pixels adjacent to the nine pixel group 882 is V1. As provided above, V2 is less than V1. Thus, the control system 22 can confirm that the nine pixel group 882 is dust.

Subsequently, after confirming that the V score of the possible pixel group is less than the V score of the adjacent pixels, the control system 22 can notify the user that it is time to clean the image sensor 20.

Figure 9:
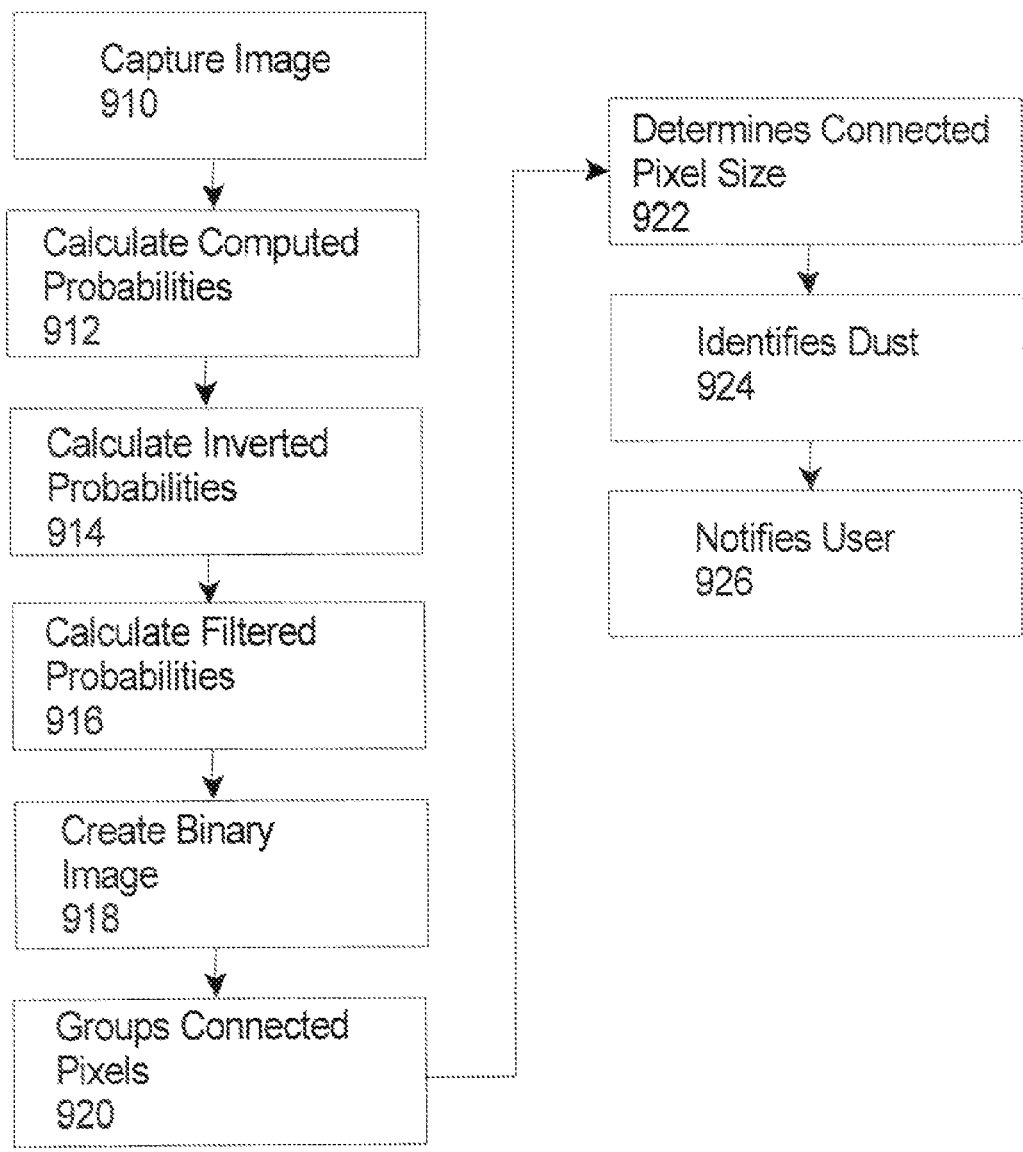
FIG. 9 is a flow chart that illustrates one method for estimating if there is dust on an image sensor.

FIG. 9 is a flow chart that illustrates one or more of the steps used to estimate if there is dust on the image sensor. At step 910, a single image is captured of an actual scene. As provided above, the control system evaluates at least one of a hue channel, a value channel, and saturation channel of the captured image to determine if there is dust on the image sensor. For example, the control system can evaluate the hue channel and the value channel of the captured image to determine if there is dust on the image sensor. At step 912, the control system computes a probability of dust for a plurality of pixels of the captured image based on the hue channel and the value channel.

Subsequently, at step 914, the control system subtracts the computed probability from one for each pixel to calculate an inverted probability for each pixel. Next, at step 916, the control system applies a filter to each pixel to calculate a filtered probability. Further, at step 918, the control system creates a binary image by setting all filtered probabilities having a value lower than a predetermined probability threshold to have a binary probability of zero, and setting all filtered probabilities having a value higher than the predetermined probability threshold to have a binary probability of one.

Subsequently, at step 920, the control system groups any adjacent pixels having a binary probability of one into one or more pixel groups. Next, at step 922, the control system determines a connected pixel size for each pixel group. The control system identifies as possible dust any pixel group having a connected pixel size that is (i) greater than or equal to a predetermined low pixel number, and (ii) less than or equal to a predetermined high pixel number.

Next, at step 924 the control system compares the average value score in the possible dust region to the average value score in the immediate border region around the possible dust region.

At step 926, the control system identifies as dust any possible dust region having an average value score in the possible dust region that is less than the average value score in the immediate border region to the possible dust. Finally, at step 928, the control system notifies the user of possible dust.

Figure 10:
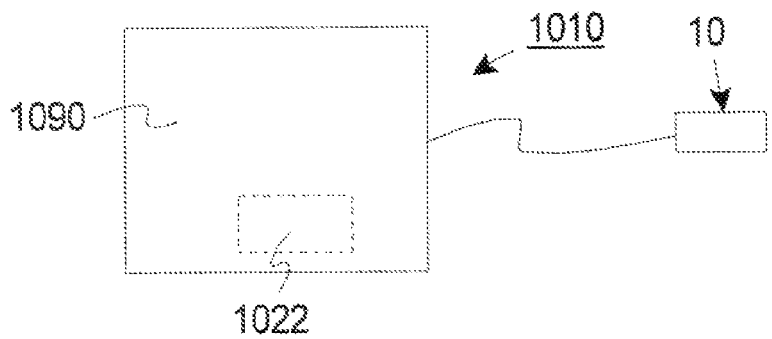
FIG. 10 illustrates another embodiment of a system having features of the present invention.

FIG. 10 illustrates another embodiment of a system 1010 having features of the present invention. In this embodiment, the system 1010 includes a computer 1090 that is electrically connected to the image apparatus 10. Further, in this embodiment, a captured image (not shown in FIG. 10) from the image apparatus 10 can be transferred to the computer 1090, and one or more steps of the dust detection can be performed by a control system 1022 of the computer 1090. With this design, a control system 1022 of the computer 1090 can detect dust on an image sensor from a single captured image.

It should be noted that other variations of the present invention are possible. For example, (i) the saturation channel information can be used instead of the hue channel information to calculate the probabilities; or (ii) both the hue channel and the saturation channel information can be used to calculate the probabilities. The later works by computing P(V|S) and P(V|H) separately, estimating dust for each, and simply combining the results. Alternatively, the probability P(V|H,S) can be computed, i.e., the probability of V given H and S.

Moreover, an additional geometric measurement can be incorporated into the basic probabilistic framework in order to improve overall detectability. For example, this geometric measurement can be based on the second derivative of the Value channel. Specifically, a spot of dust (where the Value is lower than its surrounding region) will have a locally positive second derivative. This observation can be incorporated into the existing probabilistic framework as follows. The horizontal and vertical second derivatives of the Value channel are computed using standard filtering operations. These derivatives can be denoted as Vxx and Vyy, respectively. Each of these values is passed through a sigmoid of the form: $1/(1+ 0.25\exp(-Vxx)^2)$. This sigmoid has a value of 0 for negative values of Vxx and Vyy, and transitions to a value of 1 for positive values of Vxx and Vyy.

These measurements are incorporated into the probability of dust, P(V|H) by simply replacing P(V|H) with P(V|H)×1/(1+0.25exp(−Vxx)^2)×1/(1+0.25exp(−Vyy)^2). It should be noted that if a region does not have a positive horizontal and vertical derivative, then its probability of being dust is decreased. In this way, regions of dust based on hue, value, and geometry can better be isolated.

What is claimed is:

1. A system for detecting dust on an image sensor of an image apparatus that records a captured image of an actual scene, the system comprising:
a control system that evaluates information from a hue channel and a value channel of the captured image of the actual scene to determine if there is dust on the image sensor; wherein the control system computes a probability of dust on the image sensor based on the evaluated information from the hue channel and the value channel of the captured image; and determines if there is dust on the image sensor based on the computed probability; wherein the probability is expressed as P(V=v|H=h)=P(H=h|V=v)P(V=v)/P(H=h), where P is the probability, V is a variable that embodies the image value, H is a variable that embodies the image hue, v is a value score, and h is a hue score; and wherein a possible region of dust is one that has a value score that is statistically unlikely in view of a hue score for that region.

2. The system of claim 1 wherein the control system computes the probability of dust on an image sensor by computing a probability of dust for a plurality of pixels in the captured image based on the evaluated information from the hue channel and value channel of the captured image.

3. The system of claim 1 wherein the probability is a conditional probability.

4. The system of claim 1 wherein the control system subtracts the computed probability from one for each pixel of the captured image to calculate an inverted probability for each pixel.

5. The system of claim 4 wherein the control system applies a filter to the computed probability or the inverted probability for each pixel to calculate a filtered probability.

6. The system of claim 5 wherein the control system creates a binary image by setting all filtered probabilities having a value lower than a predetermined probability threshold to have a binary probability of zero, and sets all filtered probabilities having a value that is equal to a predetermined test probability value to have the binary probability of one.

7. The system of claim 6 wherein the control system groups adjacent pixels having a binary probability of one into a pixel group, and wherein the control system determines a connected pixel size for the pixel group.

8. The system of claim 7 wherein the control system identifies as possible dust any pixel group having a connected pixel size that is greater than a predetermined low pixel number and less than a predetermined high pixel number.

9. A camera for capturing a captured image of an actual scene, the camera comprising:
an image sensor that captures information for the captured image of the actual scene; and
a control system that (i) evaluates information from a hue channel and a value channel of the captured image to calculate a probability of dust on the image sensor; and (ii) determines if there is dust on the image sensor based on the probability; wherein the control system computes a probability of dust on the image sensor based on the evaluated information from the hue channel and the value channel of the captured image; and determines if there is dust on the image sensor based on the computed probability; wherein the probability is expressed as P(V=v|H=h)=P(H=h|V=v)P(V=v)/P(H=h), where P is the probability, V is a variable that embodies the image value, H is a variable that embodies the image hue, v is a value score, and h is a hue score; and wherein a possible region of dust is one that has a value score that is statistically unlikely in view of a hue score for that region.

10. The camera of claim 9 wherein the control system computes a probability of dust on the image sensor by computing a probability of dust for a plurality of pixels in the captured image based on the evaluated information from the hue channel and value channel of the captured image.

11. The camera of claim 10 wherein the probability is a conditional probability.

12. The camera of claim 10 wherein the control system subtracts the computed probability from one for each pixel of the captured image to calculate an inverted probability for each pixel.

13. The camera of claim 12 wherein the control system applies a filter to the computed probability or the inverted probability for each pixel to calculate a filtered probability.

14. The camera of claim 13 wherein the control system creates a binary image by setting all filtered probabilities having a value lower than a predetermined probability threshold to have a binary probability of zero, and setting all filtered probabilities having a value that is equal to a predetermined test probability value to have the binary probability of one.

15. The camera of claim 14 wherein the control system groups adjacent pixels having a binary probability of one into a pixel group, and wherein the control system determines a connected pixel size for the pixel group.

16. The camera of claim 15 wherein the control system identifies as possible dust any pixel group having a connected pixel size that is greater than a predetermined low pixel number and less than a predetermined high pixel number.

17. A method for detecting dust on an image sensor of an image apparatus that records a captured image of an actual scene, the method comprising the steps of:
evaluating information from a hue channel and a value channel of the captured image; and
determining if there is dust on the image sensor based on the information from the hue channel and the value channel with a control system, wherein the control system computes a probability of dust on the image sensor based on the evaluated information from the hue channel and the value channel of the captured image; and determines if there is dust on the image sensor based on the computed probability; wherein the probability is expressed as P(V=v|H=h)=P(H=h|V=v)P(V=v)/P(H=h), where P is the probability, V is a variable that embodies the image value, H is a variable that embodies the image hue, v is a value score, and h is a hue score; and wherein a possible region of dust is one that has a value score that is statistically unlikely in view of a hue score for that region.

18. The method of claim 17 wherein the step of computing the probability of dust on the image sensor includes computing a probability of dust for a plurality of pixels in the captured image based on the evaluated information from the hue channel and value channel of the captured image.

19. The method of claim 18 wherein the probability is a conditional probability.

20. The method of claim 18 further comprising the step of subtracting the computed probability from one for each pixel of the captured image to calculate an inverted probability for each pixel.

21. The method of claim 20 further comprising the step of applying a filter to the computed probability or the inverted probability for each pixel to calculate a filtered probability.

22. The method of claim 21 further comprising the step of creating a binary image by setting all filtered probabilities having a value lower than a predetermined probability threshold to have a binary probability of zero, and setting all filtered probabilities having a value that is equal to a predetermined test probability value to have the binary probability of one.

23. The method of claim 22 further comprising the steps of grouping adjacent pixels having a binary probability of one into a pixel group, and determining a connected pixel size for the pixel group.

24. The method of claim 23 further comprising the steps of identifying as possible dust any pixel group having a connected pixel size that is greater than a predetermined low pixel number and less than a predetermined high pixel number.

25. A system for detecting dust on an image sensor of an image apparatus that captures a single captured image of an actual scene, the system comprising:

a control system that computes a probability of dust on the image sensor based on the hue channel and the value channel for a plurality of pixels of the single captured image; and determines if there is dust on the image sensor based on the ascertained probability; wherein the control system computes a probability of dust on the image sensor based on the evaluated information from the hue channel and the value channel of the captured image; and determines if there is dust on the image sensor based on the computed probability; wherein the probability is expressed as $P(V=v|H=h)=P(H=h|V=v)P(V=v)/P(H=h)$, where P is the probability, V is a variable that embodies the image value, H is a variable that embodies the image hue, v is a value score, and h is a hue score; and wherein a possible region of dust is one that has a value score that is statistically unlikely in view of a hue score for that region.

* * * * *